United States Patent Office 2,957,033
Patented Oct. 18, 1960

2,957,033

PRODUCTION OF CARBON TETRACHLORIDE AND PERCHLORETHYLENE

Marcel Ernest Degeorges and Andre Thizy, Lyon, France, assignors to Progil S.A., Paris, France, a corporation of France No Drawing. Filed Jan. 19, 1959, Ser. No. 787,355

Claims priority, application France Oct. 23, 1956

11 Claims. (Cl. 260—654)

This invention relates to the production of carbon tetrachloride and perchlorethylene from hydrocarbons and chlorine at elevated temperatures.

Carbon tetrachloride ($CCl_4$) and perchlorethylene ($C_2Cl_4$) can be obtained by chlorination between 400° and 600° C. of various aliphatic hydrocarbons from $C_1$ to $C_3$. Besides the two aforementioned products, undesirable byproducts are obtained such as hexachlorobenzene ($C_6Cl_6$) and hexachlorobutadiene ($C_4Cl_6$) and also products which can be recycled as hexachlorethane ($C_2Cl_6$) and trichlorethylene ($C_2HCl_3$). It is also known that production of said byproducts can be reduced by providing for a substantial excess of chlorine at the end of the reaction. Such a process, however, is not economical (Mac Bee, Ind. Eng. Che. 41, 1949, p. 803).

Production following this prior procedure typically produces chlorination products containing about 4.25 of the undesirable chlorination products and the yield of desired chlorination products based on the carbon of the hydrocarbon treated is below 80%, the reaction conditions being at a temperature of 520°, at a contact time of one second and an excess of free chlorine in a proportion of 5% in the bases leaving the reactor.

The object of the present invention is to provide processes for producing carbon tetrachloride and perchlorethylene from these same hydrocarbons and chlorine, in a condition freer of the undesirable chlorination products and in yields higher than heretofore obtainable, and at low cost.

Now it has been found that the foregoing objects can be attained by carrying out the process in a series of independently controlled reaction zones, as by using a series of two or more reactors instead of a single reactor as heretofore employed, and introducing the total quantity of chlorine to be used into the first reaction zone or reactor, but distributing the hydrocarbon to be chlorinated to each of the zones, the respective zones being maintained under effective or optimum temperature conditions by external cooling of the reactors or by injection of the reactants in cool gaseous form or in liquid form.

In the first reaction zone or first reactor, the reaction conditions are so regulated, but still within the known operable temperature range as from about 420° to 530° but preferably from 470° to 520° as will produce a substantial amount of hexachlorethane.

Examination has shown that the quantity of hexachlorethane formed increases in proportion to the concentration of chlorine, at temperatures up to 500°–520°, in accordance with the following exothermic reaction:

$$C_2Cl_4 + Cl_2 \rightarrow C_2Cl_6 + 36 \text{ kcal.}$$

and in advancing higher than 520°, one observes a diminution of $C_2Cl_6$ production, in accordance with the reaction:

$$C_2Cl_6 \rightarrow C_2Cl_4 + Cl_2$$

| Feed | | $C_2Cl_6$ formed in g. percent cc. of condensed product | | | |
|---|---|---|---|---|---|
| $Cl_2$, l./h. | $C_2Cl_4$, g./h. | at 480° C. | 500° C. | 520° C. | 560° C. |
| 160 | 1,000 | 7.5 | 11 | 13 | 10 |
| 80 | 1,000 | 7 | 9 | 9.5 | 5.5 |
| 40 | 1,000 | 4 | 4.2 | 5.7 | 3.5 |

The proportion of the hydrocarbon, in relation to the total chlorine, introduced into and chlorinated in the first zone or reactor can vary between one quarter and three quarters of the total.

Thus in this first zone, there is effected a chlorination of hydrocarbon in the presence of a great excess of chlorine with reference to the theoretical excess which remains always higher than 25%, the same being conducive to a reaction without undesirable by-products and the excess chlorine being combined partially in a zone of a temperature suitably from 420° to 530° preferably from 470° to 520° with the perchlorethylene for producing the hexachlorethane.

The quantity of hexachlorethane produced can vary between 7% and 20% of the production.

In the second or succeeding reaction zones or reactors, the temperatures are maintained at higher levels within known operable range as at from 530° to 600° at preferably from 530° to 560°, which will cause the hexachlorethane to decompose and be transformed into carbon tetrachloride and perchlorethylene with the release of chlorine while also causing the additional hydrocarbon and remaining inadequately chlorinated hydrocarbons to be further chlorinated by the action of the remaining excess of chlorine and the newly released nascent chlorine. This released chlorine serves an additional function in acting as a thermal buffer.

The invention is illustrated by the following examples:

*Example 1*

Three hundred and sixty liters of chlorine and 11.2 liters of propane, per hour, are fed together into an initial reactor maintained at a temperature of about 460° C. The partially reacted mixture and unreacted chlorine leaving the reactor is then fed through a cooler where its temperature is reduced to 150°–200° C., the cooling being effected suitably by the circulation of cool air on the outer surfaces of the exchanger.

This cooled reaction mixture is then mixed with 15.7 liters of propane and introduced into a second reactor maintained at a temperature of about 530° C. The resulting reaction mixture still containing excess chlorine is then fed through a second cooler and again reduced to the said lower temperature.

To this cool mixture leaving the second condenser, 17.9 liters of propane are added and the resulting mixture is introduced into a third reactor wherein the temperature is maintained at about 560° C. The gaseous reaction mixture leaving this third reaction zone still contains free chlorine amounting to 4.8%. This reaction mixture is then passed through a suitable condenser wherein the chlorine is separated, the hydrogen chloride is absorbed in water and the chlorinated hydrocarbons are collected. An analysis of the organic product obtained indicated the following:

| | | | |
|---|---|---|---|
| $CCl_4$ | 40.56% | $C_2HCl_3$ | 2.2% |
| $C_2Cl_4$ | 54.0% | $C_6Cl_6$ | 0.2% |
| $C_2Cl_6$ | 2.2% | $C_4Cl_6$ | 0.8% |

The yields of desirable products calculated on the basis of the chlorine and the carbon of the propane were respectively 95% and 93.5%. The content of undesirable by-products ($C_6Cl_6+C_4Cl_6$) does not exceed 1% of the product.

*Example 2*

One hundred and fifty liters of chlorine are mixed with 15 liters of propane previously diluted by mixing the same with 400 gm. of a liquid composed of 10 parts of hexachlorethane and 90 parts of perchlorethylene and the mixture is introduced into a reactor maintained at 520° C. by suitable cooling applied to the reactor. The gaseous reaction mixture including remaining free chlorine leaving the reactor is then cooled to a temperature of 150° C. in a suitable cooler. Thereupon 7.4 liters of propane are added to this gaseous mixture and the same is introduced into a second reactor which is maintained at a temperature of 560° C. by suitable cooling. The periods of reaction in these two reactors are respectively 1.6 and 1.7 seconds and the percentage of chlorine in the gaseous mixture leaving the second reactor is 5%.

The reaction mixture is then conducted through a condenser and a liquid product is obtained having the following composition:

| | Percent |
|---|---|
| $CCl_4$ | 17.00 |
| $C_2Cl_4$ | 78.52 |
| $C_2HCl_3$ | 0.89 |
| $C_6Cl_6$ | 0.20 |
| $C_4Cl_6$ | 0.43 |
| $C_2Cl_6$ | 2.96 |
| | 100.00 |

Taking into account the added diluents, hexachlorethane and perchlorethylene, the following yield is obtained:

| | Percent |
|---|---|
| $CCl_4$ | 38.32 |
| $C_2Cl_4$ | 51.60 |
| $C_2HCl_3$ | 2.00 |
| $C_6Cl_6$ | 0.45 |
| $C_4Cl_6$ | 0.97 |
| $C_2Cl_6$ | 6.66 |
| | 100.00 |

On the basis of the amount of chlorine and propane used, the yields of desirable products is 95% and the percentage of undesired by-products is only 1.42%. The desirable by-products, namely—trichloroethylene and hexachlorethane, can be and are recycled in the process and as a consequence these by-products are finally converted into the ultimate products, namely—carbon tetrachloride and perchlorethylene.

The reactors employed in the present process are or may be of conventional material capable of withstanding contact with the corrosive products contained in the reaction mass. The volume of the reactors is calculated to provide a predetermined optimum time of contact for the respective reactions. The reactors may be operated under any desired pressure conditions including both superatmospheric and subatmospheric pressures.

This application is a continuation-in-part of our application Serial No. 691,544, filed October 22, 1957 and now abandoned.

It should be understood that the invention is not limited to the proportions and conditions set forth herein but includes all variations which will occur to those skilled in the art upon consideration of the scope of the claims appended hereto.

We claim:

1. In the production of carbon tetrachloride and perchlorethylene by the chlorination of a low molecular aliphatic hydrocarbon at high temperatures, the process for obtaining said chlorinated hydrocarbons in a form freer of undesirable by-products which comprises, effecting the reaction in a series of at least two reaction zones involving introducing part of the hydrocarbon to be chlorinated and chlorine in an amount in excess of that which will be consumed in the whole process into the first reaction zone, maintaining said zone, by cooling, at a reaction temperature of from 420°–530° C. which effects chlorination of the hydrocarbon including the formation of hexachlorethane, introducing the chlorination products thereby obtained and the remaining unreacted chlorine into another reaction zone together with the remaining hydrocarbon to be chlorinated, maintaining this second mentioned zone, by cooling, at a reaction temperature of from 530° to 600° C. which effects chlorination of the hydrocarbon present and as well the transformation of the hexachlorethane both into carbon tetrachloride and perchlorethylene and separating the chlorinated hydrocarbons from the excess chlorine and the hydrogen chloride formed.

2. The process specified in claim 1 wherein a chlorinated hydrocarbon producing chlorine under the reaction conditions used is introduced along with the hydrocarbon into the reaction to provide part of the free chlorine required for chlorinating the hydrocarbon.

3. The process specified in claim 1 wherein only from one-quarter to three-quarters of the hydrocarbon to be chlorinated is introduced into the first reaction zone.

4. In the production of carbon tetrachloride and perchlorethylene by the chlorination of a low molecular aliphatic hydrocarbon at high temperatures, the process for obtaining said chlorinated hydrocarbons in a form freer of undesirable by-products which comprises, effecting the reaction in a series of at least two reaction zones involving introducing part of the hydrocarbon to be chlorinated and chlorine in an amount in excess of that which will be consumed in the whole process into the first reaction zone, maintaining said zone, by cooling, at a reaction temperature between 420° and 530° C. which produces from 7–20% hexachlorethane in the chlorination products obtained, introducing the chlorination products thereby obtained and the remaining unreacted chlorine into another reaction zone together with the remaining hydrocarbon to be chlorinated, maintaining this second mentioned zone, by cooling, at a reaction temperature effecting chlorination of the hydrocarbon present and as well the transformation of the hexachlorethane both into carbon tetrachloride and perchlorethylene and separating the chlorinated hydrocarbons from the excess chlorine and the hydrogen chloride formed.

5. The process specified in claim 1 wherein the temperature in the first reaction zone is maintained at about 470° to 520° C.

6. The process specified in claim 1 wherein the temperature in the first reaction zone is maintained at about 470° to 520° C. and wherein the reaction in the first reaction zone is carried out under such conditions that from 7 to 20% hexachlorethane is produced in the chlorination products obtained.

7. The process specified in claim 1 wherein the excess of chlorine in the first reaction zone always amounts to at least 25% of the theoretically required amount.

8. A process for the production of carbon tetrachloride and perchlorethylene from propane and chlorine which comprises, introducing into a first reaction zone from one-quarter to three-quarters of the total amount of propane to be chlorinated and chlorine in an amount which provides during the reaction an excess of at least 25% of the theoretical amount, maintaining said zone, by cooling, at a reaction temperature of about 500° to 520° C. whereby a substantially optimum amount of hexachlorethane in the reaction mass is produced, introducing the chlorination products thereby obtained and the remaining unreacted chlorine into another reaction zone together with the remaining hydrocarbon to be chlorinated, maintaining this second mentioned zone at a reaction temperature of from 530° to 600° C. which effects chlorination of the hydrocarbon present and as well the transformation of the hexachlorethane both into carbon tetrachloride and perchlorethylene and separating the chlorinated hydrocarbons from the excess chlorine and the hydrogen chloride formed.

9. The process specified in claim 1 wherein the reaction temperature in the second mentioned zone is maintained at a temperature of from 530° to 560° C.

10. The process of claim 1 wherein the excess chlorine in the gaseous mixture leaving the last reaction zone of the specified process amounts only to about 5%.

11. The process of claim 8 wherein the excess chlorine in the gaseous mixture leaving the last reaction zone of the specified process amounts only to about 5%.

References Cited in the file of this patent
UNITED STATES PATENTS

| | | |
|---|---|---|
| 2,160,574 | Hennig | May 30, 1939 |
| 2,442,324 | Heitz et al. | May 25, 1948 |
| 2,839,589 | Brown | June 17, 1958 |